(12) United States Patent
Uchida et al.

(10) Patent No.: US 9,720,420 B2
(45) Date of Patent: Aug. 1, 2017

(54) TWO-STAGE SWITCHING VALVE

(71) Applicant: DENSO CORPORATION, Kariya, Aichi-pref. (JP)

(72) Inventors: Kimio Uchida, Kariya (JP); Hirofumi Onodera, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/994,215

(22) Filed: Jan. 13, 2016

(65) Prior Publication Data

US 2016/0237956 A1 Aug. 18, 2016

(30) Foreign Application Priority Data

Feb. 16, 2015 (JP) .................................. 2015-27725

(51) Int. Cl.
| | |
|---|---|
| *G05D 7/01* | (2006.01) |
| *F16K 1/32* | (2006.01) |
| *B60K 15/035* | (2006.01) |
| *F02M 25/08* | (2006.01) |

(52) U.S. Cl.
CPC ......... *G05D 7/01* (2013.01); *B60K 15/03504* (2013.01); *F16K 1/32* (2013.01); *F02M 25/08* (2013.01)

(58) Field of Classification Search
CPC ........................... F16K 17/30; Y10T 137/7792
USPC ...... 138/43, 45, 46; 137/460, 498, 504, 517, 137/512.1
See application file for complete search history.

(56) References Cited

U.S. PATENT DOCUMENTS

| | | | | | |
|---|---|---|---|---|---|
| 3,794,077 | A | * | 2/1974 | Fanshier | ............... F16K 15/063 137/513.3 |
| 4,846,221 | A | * | 7/1989 | Kanemaru | ............ F16K 5/0605 137/514 |
| 4,953,588 | A | * | 9/1990 | Sands | ................... F16K 15/063 137/512.3 |
| 5,085,246 | A | * | 2/1992 | Griinke | .................... F16K 17/30 137/504 |
| 5,634,491 | A | * | 6/1997 | Benedict | .................... E03C 1/08 137/504 |
| 6,920,895 | B2 | * | 7/2005 | Avis | ......................... F16K 17/30 137/462 |
| 7,140,386 | B2 | * | 11/2006 | Avis | ......................... F16K 17/30 137/460 |
| 7,219,690 | B2 | * | 5/2007 | McDonald | .............. F16K 17/30 137/512.1 |
| 2005/0217734 | A1 | | 10/2005 | Takakura | |
| 2016/0090945 | A1 | | 3/2016 | Onodera et al. | |

* cited by examiner

*Primary Examiner* — Patrick F Brinson

(57) ABSTRACT

An annular valve seat is projected radially inward from a passage wall. A valve element is located on the upstream side of the valve seat. A spring biases the valve element toward the upstream side. The valve element has a through hole to pass fluid between the upstream side and the downstream side when the valve element is seated on the valve seat. The valve element switches between a large opening state, in which the valve element is lifted from the valve seat to pass fluid around an outer circumferential periphery of the valve element and to pass through the through hole, and a small opening state, in which the valve element is seated on the valve seat to pass fluid through the through hole. The valve element is supported and slidable on a guide surface, which is formed on the passage wall, at the outer circumferential periphery.

8 Claims, 5 Drawing Sheets

| STATE | SMALL OPENING | LARGE OPENING |
|---|---|---|
| VALVE | CLOSE (HP UPSTREAM) | OPEN (LP UPSTREAM) |
| OPERATION | | |

TWO-STAGE SWITCHING VALVE

CROSS REFERENCE TO RELATED APPLICATION

This application is based on reference Japanese Patent Application No. 2015-027725 filed on Feb. 16, 2015, the disclosure of which is incorporated herein by reference.

TECHNICAL FIELD

The present disclosure relates to a two-stage switching valve configured to switch fluid flow in two stages including a large opening state and a small opening state.

BACKGROUND

For example, Patent Document 1 discloses a vapor fuel processing apparatus equipped to a vehicle. The vapor fuel processing apparatus includes a tank sealing valve equipped with a two-stage switching valve. A vapor fuel processing apparatus is configured to cause a canister to adsorb and hold vapor fuel, which is produced in a fuel tank. The vapor fuel processing apparatus is further configured to draw the vapor fuel, which is held in the canister, into an intake passage of an internal combustion engine.

The tank sealing valve opens and closes a vapor fuel passage, which is for drawing vapor fuel produced in the fuel tank, into the canister. The tank sealing valve may include a solenoid valve and a two-stage switching valve. The solenoid valve opens and closes the vapor fuel passage. The two-stage switching valve switches a flow quantity of fluid, which flows from the fuel tank toward the canister, in two stages including a large opening state and a small opening state, when the vapor fuel passage is open. In Patent Document 1, the second valve element 70 may be equivalent to a valve element of a two-stage switching valve. According to the two-stage switching valve of Patent Document 1, the second valve element 70 is not guided in a movable direction, and therefore, a seated portion of the second valve element 70 onto the second valve seat 17 may vary. Consequently, a sealing performance of the second valve element 70 may vary as time elapses.

Patent Document 1

Publication of unexamined Japanese patent application No. 2005-291241

SUMMARY

It is an object of the present application to produce a two-stage switching valve configured to reduce variation in a seated portion of a valve element relative to a valve seat.

According to an aspect of the disclosure, a two-stage switching valve comprises a valve seat in an annular shape projected radially inward from a passage wall. The two-stage switching valve further comprises a valve element located on an upstream side of the valve seat and movable in a flow direction. The valve element is configured to be biased with a fluidic pressure from an upstream side toward a downstream side. The two-stage switching valve further comprises a spring biasing the valve element toward the upstream side. The valve element has a through hole, which is configured to pass fluid between the upstream of the valve element and the downstream of the valve element in a state the valve element is seated on the valve seat. The valve element is configured to switch between a large opening state and a small opening state. In the large opening state, the valve element is lifted from the valve seat to pass fluid around an outer circumferential periphery of the valve element and to pass through the through hole. In the small opening state, the valve element is seated on the valve seat to pass fluid through the through hole. The valve element is supported and slidable at the outer circumferential periphery on a guide surface, which is formed on the passage wall.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
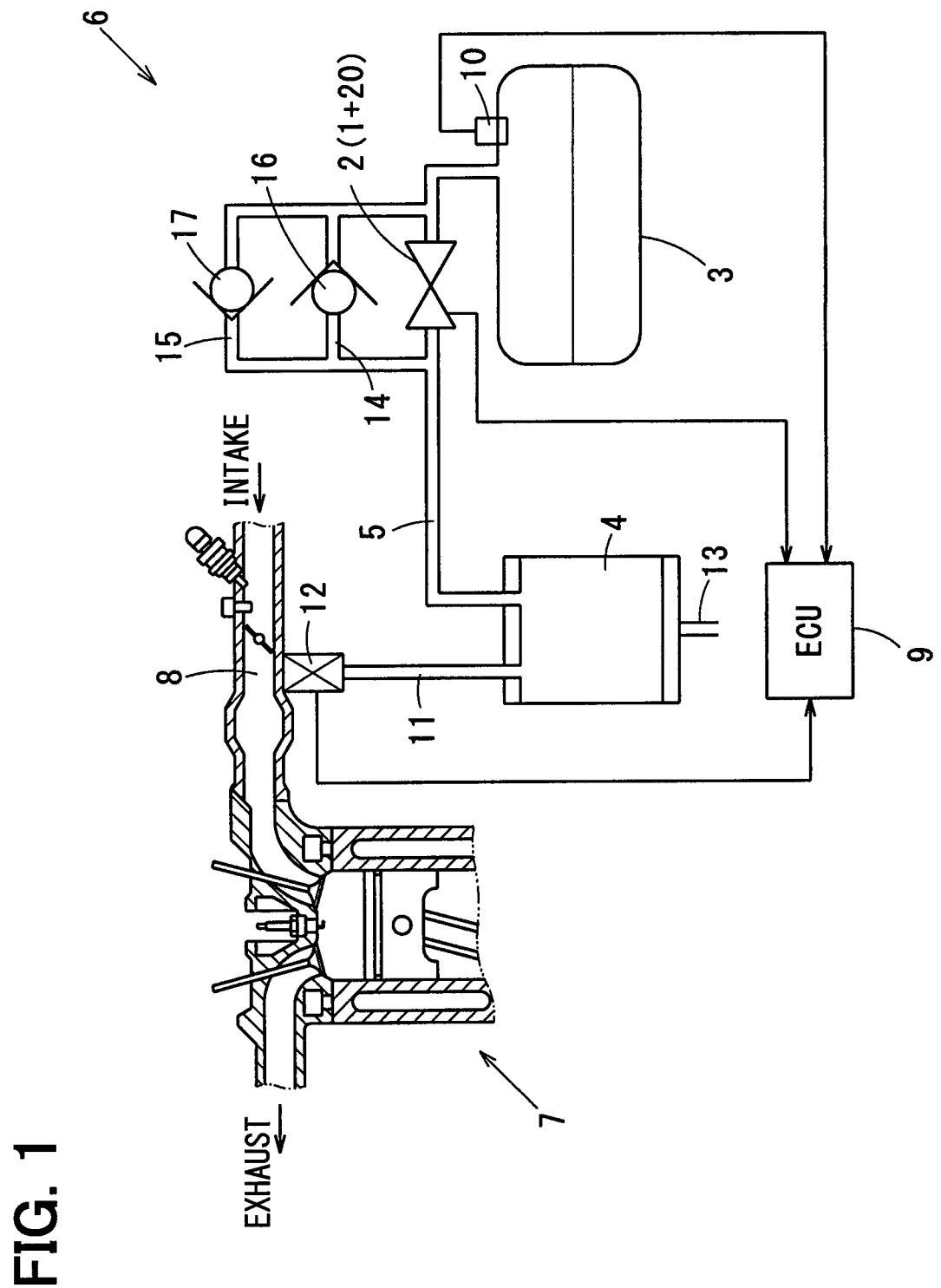
FIG. 1 is a diagram showing a vapor fuel processing apparatus.

As follows, embodiments of the present disclosure will be described. The embodiments are specific examples, and the present disclosure is not limited to the embodiments.

Embodiment

Configuration of Embodiment

A configuration of a two-stage switching valve 1 of the embodiment will be described with reference to FIGS. 1 to 4. The two-stage switching valve 1 is configured to switch a flow quantity of fluid between two levels including a large opening state and a small opening state. The two-stage switching valve 1 may be, for example, one component of a tank sealing valve 2 equipped to a vehicle. The tank sealing valve 2 is configured to open and close a vapor fuel passage 5. The vapor fuel passage 5 is for drawing vapor fuel, which is produced in a fuel tank 3, into a canister 4. The tank sealing valve 2 may be one component of a vapor fuel processing apparatus 6 equipped to the vehicle.

The vapor fuel processing apparatus 6 will be first described. As shown in FIG. 1, the vapor fuel processing apparatus 6 is, for example, configured to cause the canister 4 to adsorb and hold vapor fuel in the fuel tank 3. The vapor fuel processing apparatus 6 draws vapor fuel, which is held in the canister 4, into an intake passage 8 of an internal combustion engine 7, while the internal combustion engine 7 is in operation. In this way, the vapor fuel processing apparatus 6 purges fuel vapor. A control device (ECU) 9 controls operations of various kinds of electronic functional components for the vapor fuel processing apparatus 6. The ECU 9 may also control the internal combustion engine 7.

The fuel tank 3 accumulates liquid fuel such as gasoline. The fuel tank 3 has an upper space containing vapor fuel in a gaseous phase. The fuel tank 3 is equipped with a tank pressure sensor 10 to detect a pressure in the upper space. The tank pressure sensor 10 detects the pressure and sends a sensor value of the detected pressure to the ECU 9. The sensor value is utilized to control the electric functional components.

The canister 4 is a vessel to accommodate an adsorption material, such as activated carbon, which is to absorb and hold vapor fuel. The canister 4 is connected to the upper space of the fuel tank 3 through the vapor fuel passage 5. In addition, the canister 4 is connected to a negative pressure generating region of the intake passage 8 through the purge passage 11. The negative pressure generating region is, for example, a downstream of a throttle valve relative to an intake air flow. The purge passage 11 is equipped with a purge valve 12, which opens and closes the purge passage 11 to control an opening of the purge passage 11. The canister 4 is enabled to draw atmospheric air through an air introduction passage 13. The air drawing passage 13 is equipped with an air drawing valve (not shown).

Two bypass passages 14 and 15 are equipped between the canister 4 and the fuel tank 3 to bypass the tank sealing valve 2. One bypass passage 14 is equipped with a positive pressure relief valve 16 for permitting flow of fluid from the fuel tank 3 into the canister 4. The other bypass passage 15 is equipped with a negative pressure relief valve 17 for permitting flow of fluid from the canister 4 into the fuel tank 3.

Figure 2:
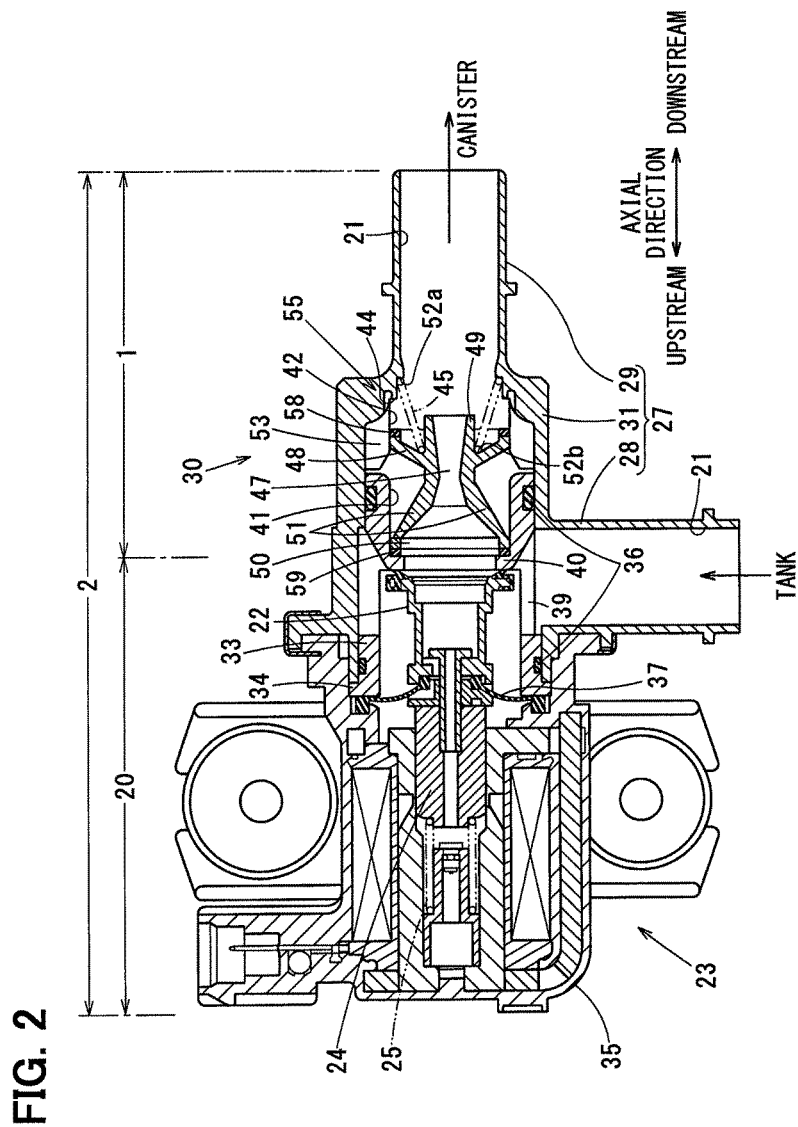
FIG. 2 is a sectional view showing an inner configuration of a tank sealing valve.

Subsequently, the tank sealing valve 2 will be described. The tank sealing valve 2 includes a solenoid valve 20 and the two-stage switching valve 1, which are integrated with each other. The solenoid valve 20 opens and closes the vapor fuel passage 5. As shown in FIG. 2, the embodiment shows an example in which the solenoid valve 20 and the two-stage switching valve 1 are coaxial with each other.

The solenoid valve 20 is a block valve configured to seal the fuel tank 3 when closing. The solenoid valve 20 has a normally close configuration to open when supplied with electricity. The solenoid valve 20 includes a valve element 22, a solenoid actuator 23, and a return spring 25. The valve element 22 is in a tubular shape to open and close an L-shaped passage 21 of the vapor fuel passage 5. The L-shaped passage 21 bends fluid flow to guide fluid to flow in an L-shape. The solenoid actuator 23 produces a magnetic attractive force when supplied with electricity thereby to actuate the valve element 22 to an open side. The return spring 25 biases both the armature 24 and the valve element 22 of the solenoid actuator 23 to a close side.

The L-shaped passage 21 includes a passage formation element 27 including an inlet pipe 28 and an outlet pipe 29. The inlet pipe 28 is connected with a pipe on the side of the fuel tank 3. The outlet pipe 29 is connected with a pipe on the side of the canister 4. The L-shaped passage 21 accommodates the valve element 22 of the solenoid valve 20 and the valve element 30 of the two-stage switching valve 1. The valve element 22 and the valve element 30 are coaxial with the outlet pipe 29.

Specifically, the passage formation element 27 includes a valve accommodation pipe 31 equipped to be coaxial with the outlet pipe 29. The valve accommodation pipe 31 accommodates the valve element of the solenoid valve 20 and the valve element 30 of the two-stage switching valve 1. The valve accommodation pipe 31 forms a part of a passage wall of the vapor fuel passage 5. The inlet pipe 28 opens in a lateral surface of the valve accommodation pipe 31. In the following description, a direction, in which a center axis of the valve accommodation pipe 31 extends, is referred as an axial direction. The axial direction coincides with a flow direction of fluid containing vapor fuel.

An inserted element 33 is inserted inside the valve accommodation pipe 31. The inserted element 33 is in a tubular shape. The inserted element 33 includes an annular projection 34 formed on an outer circumferential periphery of an end of the valve accommodation pipe 31. The annular projection 34 is interposed and supported between the housing 35 of the solenoid actuator 23 and an end of the valve accommodation pipe 31. The inserted element 33 has an outer periphery equipped with an O-ring 36. The O-ring 36 seals the valve accommodation pipe 31 from the inserted element 33.

A diaphragm 37 is formed of rubber. The diaphragm 37 has an outer circumferential periphery interposed between the inserted element 33 and the housing 35. The diaphragm 37 is a partitioning component in a ring-shape. The diaphragm 37 is to restrict vapor fuel, which flows through the L-shaped passage 21, from intruding into the solenoid actuator 23. The diaphragm 37 has an inner circumferential periphery interposed and supported between the valve element 22 and the armature 24.

The inserted element 33 has a lateral surface defining an opening 39. The opening 39 draws vapor fuel, which is supplied from the inlet pipe 28, into the inserted element 33. The inserted element 33 has a valve seat 40 and a guide surface 41. The valve element 22 is seated on the valve seat 40. The guide surface 41 slidably supports the valve element 30 of the two-stage switching valve 1. The valve element 30 of the two-stage switching valve 1 is slidably supported by two guide surfaces 41 and 42 on the upstream side and the downstream side, respectively, in the axial direction. The guide surface 42 on the downstream side is formed in the valve accommodation pipe 31.

The valve seat 40 has a center portion forming an opening, which extends therethrough in the axial direction. The opening of the valve seat 40 is opened and closed with the valve element 22. The inserted element 33 has an inner circumferential periphery on the downstream side relative to the valve seat 40. The inner circumferential periphery of the inserted element 33 forms a passage wall of the vapor fuel passage 5. When electricity supplied to the solenoid actuator 23 is turned off, the valve element 22 is seated onto the valve seat 40, thereby to close the opening hole of the valve seat 40 and to close the solenoid valve 20. When electricity supplied to the solenoid actuator 23 is turned on, the valve element 22 is lifted from the valve seat 40, thereby to open the opening hole of the valve seat 40 and to open the solenoid valve 20.

Subsequently, the two-stage switching valve 1 will be described. The two-stage switching valve 1 is configured to switch between the large opening state and the small opening state by moving the valve element 30 in the axial direction while slidably supporting the valve element 30 on the two guide surfaces 41 and 42. The two-stage switching valve 1 includes the valve seat 44, the valve element 30, and a springs 45 described as follows. The valve seat 44 is in an annular shape and is located at a downstream end of the guide surface 42 in the valve accommodation pipe 31. The valve seat 44 is projected stepwise radially inward.

Figures 3, 4:
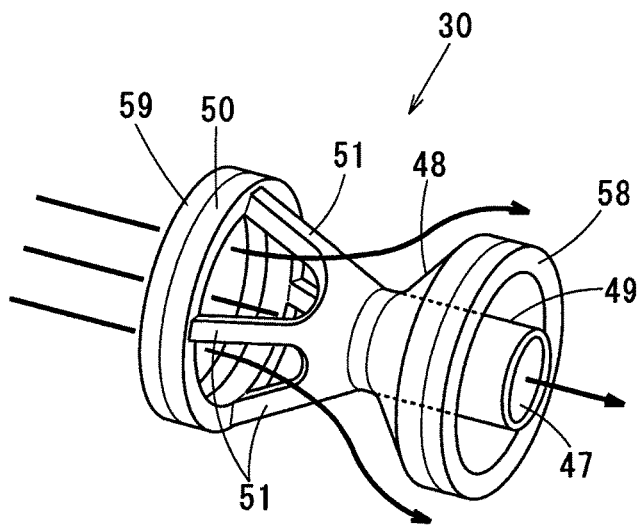
FIG. 3 is a perspective view showing a valve element of a two-stage switching valve.
FIG. 4 is an explanatory view showing the two-stage switching valve in a small opening state and a large opening state.

The valve element 30 is located on an upstream side of the valve seat 44 and is movably supported in the axial direction along a direction of the fluid flow. The valve element 30 is biased with a fluidic pressure from the upstream side toward the downstream side. The valve element 30 is further biased from the spring 45 toward the upstream side. As follows, the valve element 30 and the spring 45 will be explained in detail. The valve element 30 has a through hole 47, which enables fluid to pass between its upstream side and its downstream side, even when the valve element 30 is seated on the valve seat 44. The valve element 30 has an outer circumferential periphery slidable on the guide surface 42 such that the valve element 30 is movably supported. As shown in FIG. 3, the valve element 30 includes a valve portion 48, a small-diameter pipe 49, an upstream guide 50, and multiple legs 51.

The valve portion 48 opens and closes the vapor fuel passage 5. The valve portion 48 receives a fluidic pressure from fluid on the upstream side and a biasing force of the spring 45. A portion of the valve portion 48 on the upstream side is in a conical tapered shape increasing in diameter toward the downstream side. This portion of the valve portion 48 receives a fluidic pressure mainly on its surface on the upstream side. The small-diameter pipe 49 is equipped to extend in the axial direction from a root of a center of the valve portion 48 on the downstream side. The through hole 47 is formed to extend through the center of the valve portion 48 to reach an inner circumferential periphery of the small-diameter pipe 49. The through hole 47 may be in a form of a Laval nozzle (convergent-divergent nozzle: refer to FIG. 4).

The spring 45 is a helical compression spring rolled substantially in a conical shape. The spring 45 is assembled in a compressed form between a spring seat 52a and a spring seat 52b. The spring seat 52a is formed on a passage wall on the downstream side relative to the valve seat 44. The spring seat 52b is formed on the valve element 30. The spring seat 52b is formed on a root of the small-diameter pipe 49. Specifically, the spring seat 52b is formed on a corner portion formed at a connection between the valve portion 48 and the small-diameter pipe 49.

The valve portion 48 has a downstream portion, which is in a tubular shape and has an outer periphery slidable on the guide surface 42. The guide surface 42 is formed in the valve accommodation pipe 31 and is located between a downstream end of the inserted element 33 and the valve seat 44. More specifically, the guide surface 42 is formed on an inner circumferential end surface of multiple ribs 53. The multiple ribs 53 are projected radially inward from an inner circumferential periphery of the valve accommodation pipe 31. The ribs 53 adjacent to each other in the circumferential direction form a space therebetween. The space between the ribs 53 serves as a passage, through which fluid flows along a periphery of the valve portion 48 to bypass the valve portion 48, when the valve element 30 moves toward the upstream side. The upstream guide 50 is in a tubular shape and is located on the upstream side of the valve portion 48. The upstream guide 50 is slidably supported by the guide surface 41. The multiple legs 51 connect the valve portion 48 with the upstream guide 50.

As described subsequently, the valve element 30 having the above-described configuration switches between the large opening state and the small opening state (refer to FIG. 4). Specifically, the large opening state is a state in which the valve portion 48 is lifted from the valve seat 44 to enable fluid to pass around the outer circumferential periphery of the valve portion 48 and to pass through the through hole 47. The small opening state is a state in which the valve portion 48 is seated on the valve seat 44 to enable fluid to pass selectively (only) through the through hole 47.

In a state where the solenoid valve 20 opens, when pressure in the fuel tank 3 is high to apply high fluidic pressure from the upstream side onto the valve portion 48, the valve portion 48 is seated to the valve seat 44 thereby to be in the small opening state. Contrary, in the state where the solenoid valve 20 opens, when pressure in the fuel tank 3 is low to apply low fluidic pressure from the upstream side onto the valve portion 48, the valve portion 48 is lifted from the valve seat 44 thereby to be in the large opening state.

Figure 5:
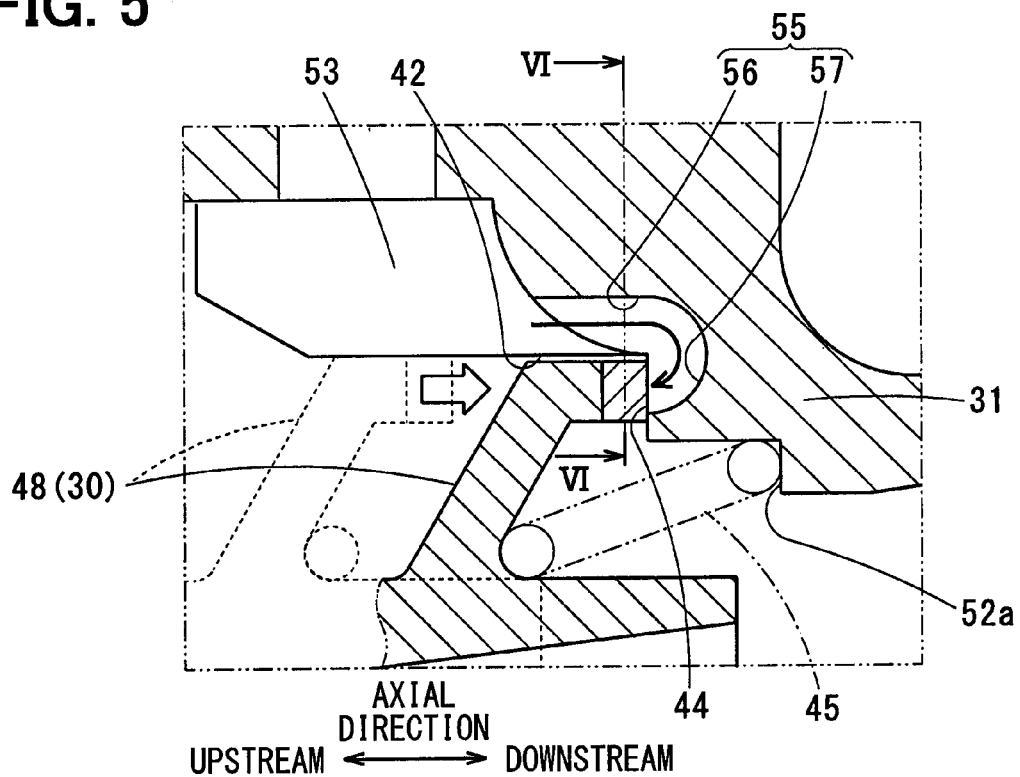
FIG. 5 is a sectional view showing an inner configuration of the two-stage switching valve.
Figure 6:
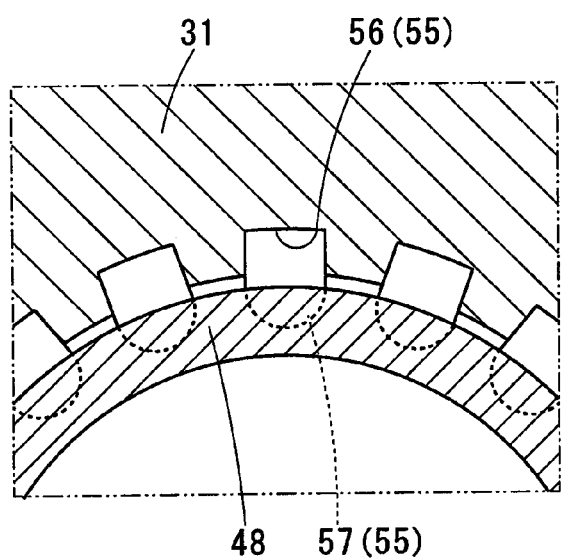
FIG. 6 is a sectional view taken along a line VI-VI in FIG. 5.

As shown in FIGS. 5 and 6, the two-stage switching valve 1 has notches 55 as described subsequently. Specifically, the notches 55 are formed with grooves 56 and holes 57. The notches 55 include multiple voids continually formed along the circumferential direction to be distant from each other. Each of the grooves 56 is formed in the guide surface 42 to be dented radially outward. Each of the holes 57 is formed in the valve seat 44 and is dented toward the downstream side. The notches 55 enable fluid to flow around the outer circumferential periphery of the valve portion 48 toward the downstream side of the valve portion 48, even in the small opening state.

The guide surface 42 is slidable on the outer circumferential periphery of the valve portion 48 at a location around the upstream of the valve seat 44. The guide surface 42 is slidable on the outer circumferential periphery of the valve portion 48 entirely in the circumferential direction. The valve accommodation pipe 31 has an inner circumferential periphery projected radially inward in a predetermined range on the upstream side relative to the valve seat 44 thereby to be in a tapered shape. That is, the inner circumferential periphery of the valve accommodation pipe 31 decreases in the diameter toward the downstream side in the predetermined range on the upstream from the valve seat 44. The inner circumferential periphery of the valve accommodation pipe 31 is the same in the diameter as the inner circumferential periphery of the rib 53 around the upstream of the valve seat 44 thereby to function as the guide surface 42. The groove 56 is defined by the inner circumferential peripheries projected radially inward around the upstream side of the valve seat 44. The grooves 56 continue with the holes 57.

Figure 7A:
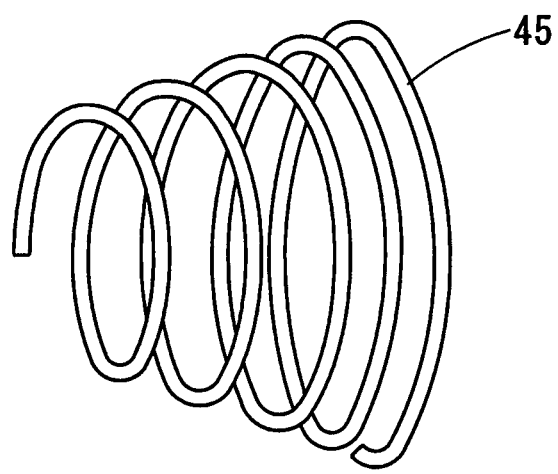
FIG. 7A is a perspective view showing a spring.
Figure 7B:
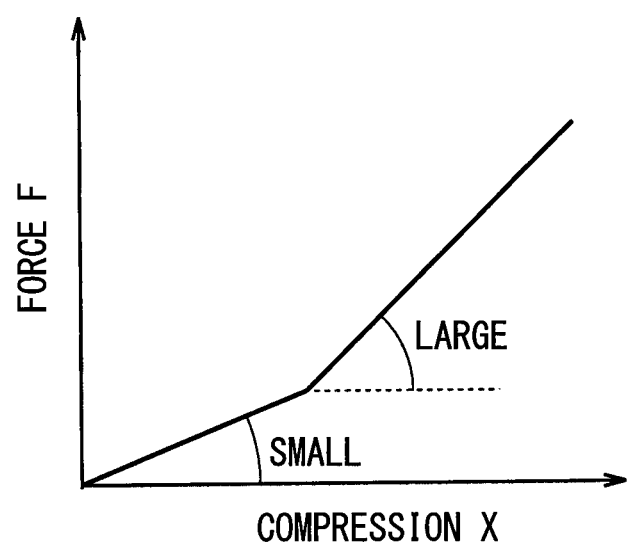
FIG. 7B is a graph showing a relation between an amount of compression of the spring and a spring constant of the spring.

The spring 45 has a spring constant, which increases as the valve element 30 moves to the downstream side. That is, the spring 45 increases in the spring constant, as its amount of compression increases, For example, the spring 45 has a two-stage characteristic. More specifically, as shown in FIG. 7B, the spring 45 shows a small spring constant when the amount of compression is less than a predetermined threshold. To the contrary, the spring 45 shows a large spring constant when the amount of compression is greater than or equal to a predetermined threshold.

The valve element 30 has a seated portion, which is seated onto the valve seat 44. The seated portion is formed of rubber. Specifically, in the valve element 30, the valve portion 48, the small-diameter pipe 49, the upstream guide 50, and the leg 51 are integrally formed of a resin material and/or the like. The valve portion 48 has an end surface on the downstream side, and the end surface is equipped with a rubber stopper 58 in a ring shape. The rubber stopper 58 serves as the seated portion seated onto the valve seat 44. The upstream guide 50 has an end surface on the upstream side, and the end surface is also equipped with the rubber stopper 59 in a ring shape.

Effect of Embodiment

In the two-stage switching valve 1 of the embodiment, the valve element 30 is movably supported such that the outer circumferential periphery of the valve element 30 is slidable on the guide surfaces 41 and 42. The present configuration enables to guide the valve element 30 in the direction in which the valve element 30 is movable. Therefore, the present configuration of the two-stage switching valve 1 enables to reduce variation in a seated portion of the valve portion 48 relative to the valve seat 44.

The two-stage switching valve 1 has the notches 55 as follows. Specifically, the notches 55 are formed with grooves 56 and holes 57. Each of the grooves 56 is formed in the guide surface 42 to be dented radially outward. Each of the holes 57 is formed in the valve seat 44 and is dented toward the downstream side. The notches 55 enable fluid to flow around the outer circumferential periphery of the valve element 30 toward the downstream side of the valve portion 48, even in the small opening state.

The present configuration enables to apply fluidic pressure on the downstream side of the valve portion 48 toward the upstream side continually before the valve portion 48 is seated onto the valve seat 44 and after the valve portion 48 is seated onto the valve seat 44. Therefore, the present configuration enables to reduce the velocity of the valve element 30 when the valve element 30 is seated onto the valve seat 44. In this way, the two-stage switching valve 1 enables to mitigate impact caused when the valve portion 48 is seated onto the valve seat 44.

The spring 45 has the spring constant, which increases as the valve element 30 moves toward the downstream side. The present configuration enables to increase the biasing force of the spring 45, as the valve portion 48 approaches the valve seat 44. Therefore, the present configuration enables to reduce speed of the valve portion 48 when the valve portion 48 is seated onto the valve seat 44. In this way, the present configuration enables further to reduce impact when the valve portion 48 is seated onto the valve seat 44.

The valve element 30 has the seated portion, which is seated onto the valve seat 44. The seated portion is formed of rubber. The present configuration enables the seated portion further to absorb impact when the valve portion 48 is seated onto the valve seat 44. In this way, the present configuration enables further to mitigate impact when the valve portion 48 is seated onto the valve seat 44.

Modification

The two-stage switching valve 1 is not limited to the above-described embodiment and may employ various modifications. For example, the two-stage switching valve 1 according to the embodiment includes the valve element 30 guided by the guide surfaces 41 and 42 at the two divided locations including the position on the upstream side and the position on the downstream side. It is noted that, the valve portion 48 may be guided by selectively (only) by the guide surface 42.

In the two-stage switching valve 1 according to the embodiment, the guide surface 42 is mainly the inner circumferential peripheries of the multiple ribs 53. In addition, the guide surface 42 is slidable on the outer circumferential periphery of the valve portion 48 entirely in the circumferential direction selectively (only) around the upstream of the valve seat 44. It is noted that, the guide surface 42 is not limited to the embodiment. For example, the guide surface 42 may not include the inner circumferential peripheries of the ribs 53. The guide surface 42 may be formed such that the guide surface 42 is slidable on the outer circumferential periphery of the valve portion 48 entirely in the circumferential direction entirely in a movable ranges of the valve portion 48. Selectively (only) the inner circumferential periphery of the rib 53 may form the guide surface 42 entirely in the movable range of the valve portion 48.

According to the disclosure, the two-stage switching valve includes the valve seat, the valve element, and the spring. The valve seat is projected from the passage wall radially inward. The valve seat is in the annular shape. The valve element is located on the upstream side of the valve seat and is movable in the flow direction. The valve element is biased with a fluidic pressure from its upstream side toward the downstream side. The spring biases the valve element toward the upstream side.

The valve element has the through hole, which enables fluid to pass between its upstream side and its downstream side, even in the state where the valve element is seated on the valve seat. The valve element switches between the large opening state and the small opening state. Specifically, the large opening state is the state in which the valve element is lifted from the valve seat to enable fluid to pass around the outer circumferential periphery of the valve element and to pass through the through hole. The small opening state is a state in which the valve element is seated on the valve seat to enable fluid to pass only through the through hole. The valve element is supported and slidable on the guide surface, which is formed on the passage wall, at the outer circumferential periphery, such that the valve element is movable.

The present configuration enables to guide the valve element in the direction in which the valve element is movable. Therefore, the present configuration of the two-step switching valve enables to reduce variation in the seated portion of the valve element relative to the valve seat.

According to the disclosure, the two-stage switching valve has the notch. Specifically, the notch is formed by continuing the groove, which is dented from the guide surface radially outward, and the hole, which is dented from the valve seat toward the downstream side.

The notch enables fluid to pass around the outer circumferential periphery of the valve element into the downstream of the valve element even in the small opening state. In this way, fluidic pressure is continually applied onto the downstream side of the valve element toward the upstream side before the valve element is seated on the valve seat and after the valve element is seated on the valve seat. Therefore, the present configuration enables to reduce a velocity of the valve element when the valve element is seated onto the valve seat. As a result, the two-stage switching valve enables to mitigate impact caused when the valve element is seated onto the valve seat.

According to the disclosure, the spring constant of the spring increases, as the valve element moves toward the downstream side.

The present configuration enables to increase the biasing force of the spring, as the valve element approaches the valve seat. Therefore, the present configuration enables to reduce the velocity of the valve element when the valve element is seated onto the valve seat. Accordingly, the two-stage switching valve enables to mitigate an impact occurring when the valve element is seated onto the valve seat.

According to the disclosure, the valve element includes the seated portion, which is seated onto the valve seat. The seated portion is formed of rubber.

The present configuration enables to cause the seated portion to absorb an impact caused when the valve element is seated onto the valve seat. Accordingly, the present configuration enables further to mitigate an impact caused when the valve element is seated onto the valve seat.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A two-stage switching valve comprising:
   a valve seat in an annular shape projected radially inward from a passage wall;
   a valve element located on an upstream side of the valve seat and movable in a flow direction, the valve element being configured to be biased with a fluidic pressure from an upstream side toward a downstream side; and
   a spring biasing the valve element toward the upstream side, wherein
   the valve element has a through hole, which is configured to pass fluid between the upstream of the valve element and the downstream of the valve element in a state the valve element is seated on the valve seat,
   the valve element is configured to switch between a large opening state and a small opening state, wherein
   in the large opening state, the valve element is lifted from the valve seat to pass fluid around an outer circumferential periphery of the valve element and to pass through the through hole, and
   in the small opening state, the valve element is seated on the valve seat to pass fluid through the through hole, wherein
   the valve element is supported and slidable at the outer circumferential periphery on a guide surface, which is formed on the passage wall,
   the guide surface and the valve seat define a notch including a groove and a hole,
   the groove is dented from the guide surface radially outward,
   the hole is dented from the valve seat toward the downstream side, and
   the hole continues from the groove.

2. The two-stage switching valve according to claim 1, wherein
   the spring has a spring constant, which increases as the valve element moves toward the downstream side.

3. The two-stage switching valve according to claim 1, wherein
   the valve element has a seated portion, which is configured to be seated on the valve seat, and
   the seated portion is formed of rubber.

4. A two-stage switching valve comprising:
   a valve seat in an annular shape projected radially inward from a passage wall;
   a valve element located on an upstream side of the valve seat and movable in a flow direction, the valve element being configured to be biased with a fluidic pressure from an upstream side toward a downstream side; and
   a spring biasing the valve element toward the upstream side, wherein
   the valve element has a through hole, which is configured to pass fluid between the upstream of the valve element and the downstream of the valve element in a state the valve element is seated on the valve seat,
   the valve element is configured to switch between a large opening state and a small opening state, wherein
   in the large opening state, the valve element is lifted from the valve seat to pass fluid around an outer circumferential periphery of the valve element and to pass through the through hole, and
   in the small opening state, the valve element is seated on the valve seat to pass fluid through the through hole, wherein
   the valve element is supported and slidable at the outer circumferential periphery on a guide surface, which is formed on the passage wall, and
   the spring has a spring constant, which increases as the valve element moves toward the downstream side.

5. The two-stage switching valve according to claim 4, wherein
   the spring increases in the spring constant, as an amount of compression of the spring increases.

6. The two-stage switching valve according to claim 5, wherein
   the spring has a two-stage characteristic, wherein
   the spring shows a small spring constant when the amount of compression is less than a predetermined threshold, and
   the spring shows a large spring constant when the amount of compression is greater than or equal to the predetermined threshold.

7. The two-stage switching valve according to claim 5, wherein
   the spring is a helical compression spring rolled substantially in a conical shape.

8. The two-stage switching valve according to claim 4, wherein
   the valve element has a seated portion, which is configured to be seated on the valve seat, and
   the seated portion is formed of rubber.

* * * * *